United States Patent
Andree et al.

(10) Patent No.: US 12,105,532 B2
(45) Date of Patent: Oct. 1, 2024

(54) METHOD FOR DRIVERLESS TRANSFER OF A VEHICLE OVER A ROUTE WITHIN A CLOSED AREA

(71) Applicant: Bayerische Motoren Werke Aktiengesellschaft, Munich (DE)

(72) Inventors: Sascha Andree, Groebenzell (DE); Matthias Maron, Leipzig (DE); Bernhard Geiler, Munich (DE)

(73) Assignee: Bayerische Motorenwerke Aktiengesellschaft, Munich (DE)

( * ) Notice: Subject to any disclaimer, the term of this patent is extended or adjusted under 35 U.S.C. 154(b) by 456 days.

(21) Appl. No.: 17/309,291

(22) PCT Filed: Oct. 7, 2019

(86) PCT No.: PCT/EP2019/077001
§ 371 (c)(1),
(2) Date: May 17, 2021

(87) PCT Pub. No.: WO2020/151844
PCT Pub. Date: Jul. 30, 2020

(65) Prior Publication Data
US 2022/0011774 A1 Jan. 13, 2022

(30) Foreign Application Priority Data
Jan. 23, 2019 (DE) .......... 102019101569.3

(51) Int. Cl.
*G05D 1/227* (2024.01)
*B60W 60/00* (2020.01)
(Continued)

(52) U.S. Cl.
CPC ....... *G05D 1/2274* (2024.01); *B60W 60/0025* (2020.02); *G05D 1/0212* (2013.01);
(Continued)

(58) Field of Classification Search
CPC .... G05D 1/028; G05D 1/0212; G05D 1/0272; G05D 1/0276; G05D 2201/0213;
(Continued)

(56) References Cited

U.S. PATENT DOCUMENTS 7,688,225 B1 * 3/2010 Haynes ..................... G08G 1/14
348/148
10,120,388 B2 * 11/2018 Sakai .................... E02F 9/2045
(Continued)

FOREIGN PATENT DOCUMENTS

CN 102829791 A 12/2012
CN 103733084 A 4/2014
(Continued)

*Primary Examiner* — Dale W Hilgendorf
(74) *Attorney, Agent, or Firm* — Kieran O'Leary; 2SPL Patent Attorneys PartG mbB

(57) ABSTRACT

A method of providing trajectory planning for the driverless transfer of a vehicle within a closed area is proposed. In the method, an external data processing system performs trajectory planning for travelling a predetermined route from a starting point to a destination point within the closed area without a driver. Trajectory planning is based on data transmitted from components of a vehicle-external infrastructure to the external data processing system, including object data and at least one exact pose of the vehicle at predetermined points in time. The planned trajectory is then transmitted to the vehicle for execution.

16 Claims, 2 Drawing Sheets

(51) Int. Cl.
*G05D 1/00* (2024.01)
*G05D 1/226* (2024.01)
*G05D 107/40* (2024.01)
*G05D 107/60* (2024.01)
*G06F 18/25* (2023.01)
*H04W 4/44* (2018.01)

(52) U.S. Cl.
CPC ......... *G05D 1/0272* (2013.01); *G05D 1/0276* (2013.01); *G05D 1/028* (2013.01); *G05D 1/226* (2024.01); *G06F 18/256* (2023.01); *H04W 4/44* (2018.02); *G05D 2107/40* (2024.01); *G05D 2107/60* (2024.01)

(58) Field of Classification Search
CPC .... G05D 1/0282; G05D 1/2274; G05D 1/226; G05D 2107/40; G05D 2107/60; B60W 60/0025; G06F 18/256; H04W 4/44
See application file for complete search history.

(56) References Cited

U.S. PATENT DOCUMENTS

| | | | |
|---|---|---|---|
| 11,117,564 B2* | 9/2021 | Mielenz | G05D 1/0297 |
| 11,325,586 B2* | 5/2022 | Nakata | B60W 60/001 |
| 11,370,457 B2* | 6/2022 | Hara | B62D 15/0285 |
| 11,520,344 B2* | 12/2022 | Ben Shalom | G05D 1/0282 |
| 2012/0303176 A1* | 11/2012 | Wong | G01S 17/89 701/1 |
| 2018/0246525 A1* | 8/2018 | Hiramatsu | G06V 20/10 |
| 2018/0350238 A1* | 12/2018 | Atlinger | G01C 21/3685 |
| 2020/0119775 A1* | 4/2020 | Park | G08G 1/096783 |
| 2020/0209878 A1* | 7/2020 | Shoda | G06V 20/56 |
| 2021/0078601 A1* | 3/2021 | Sugano | G08G 1/146 |
| 2021/0086757 A1* | 3/2021 | Sugano | B62D 15/0285 |
| 2021/0114585 A1* | 4/2021 | Sugano | G08G 1/146 |
| 2021/0221359 A1* | 7/2021 | Yamamoto | B62D 15/0285 |
| 2021/0331701 A1* | 10/2021 | Hur | H04W 4/44 |

FOREIGN PATENT DOCUMENTS

| | | |
|---|---|---|
| CN | 105890611 A | 8/2016 |
| DE | 102010028452 A1 | 11/2011 |
| DE | 102015002405 A1 | 8/2016 |
| DE | 102015007531 B3 | 9/2016 |
| DE | 102016004204 A1 | 10/2017 |
| DE | 102016122990 A1 | 5/2018 |

\* cited by examiner

METHOD FOR DRIVERLESS TRANSFER OF A VEHICLE OVER A ROUTE WITHIN A CLOSED AREA

CROSS-REFERENCE TO RELATED APPLICATIONS

This application is a 35 U.S.C. § 371(c) national stage entry of PCT/EP2019/077001, filed on Oct. 7, 2019. That application claimed priority to German Application 10 2019 101 569.1 filed on Jan. 23, 2019. The contents of the earlier filed applications are incorporated by reference herein in their entirety.

FIELD

The invention relates to a method for the driverless transfer of a vehicle over a route within a closed area.

BACKGROUND

After completion of the manufacturing and testing process of a vehicle, the customer-ready vehicle is moved several times until it is received by the customer. This is done by manually transferring the vehicle by a person driving the vehicle or by transporting the vehicle by means of a transport vehicle (trailer).

These vehicle movements result in significant costs, such as personnel expenses when the vehicle is moved manually or when the vehicle is transported in a trailer, expenses to protect the vehicle interior against damage when entering or leaving the vehicle, expenses to protect the vehicle interior against soiling, and the costs associated with damage to new vehicles.

In the German patent application DE 10 2010 028 452 A1, a method is proposed for the driverless transfer of a passenger vehicle over a route in the factory process, in the distribution process or in between, in which, depending on the route information, one or more actuators of the vehicle are controlled which affect the movement of the vehicle.

Based on the known prior art, it is an object of the present invention to provide a method wherein a further improvement of a method for the driverless transfer of a vehicle over a route within a closed area is provided. This object is solved according to the invention by the features of the independent patent claims. Advantageous embodiments are the subject of the dependent claims.

SUMMARY

The current state of the art requires appropriate hardware equipment for calculating the trajectory in the vehicle, which is to be moved driverless, i.e. autonomously and/or automatically. To enable the driverless transfer of a vehicle, appropriate actuators of the vehicle, e.g. steering, brakes, engine, transmission, are controlled so that the vehicle may follow a predetermined route. However, the actuators are typically not controlled directly, but indirectly via the corresponding internal control devices in the vehicle, such as engine control, transmission control, steering control and brake control. The actuators may also be controlled externally, e.g. via mobile radio, WLAN or other suitable communication devices.

In addition, it is necessary to know the current pose of the vehicle, i.e. the combination of position and orientation of the vehicle in space, as well as the destination to be approached, and to generate a route from this. Based on the route to be travelled, trajectory planning is then carried out for smaller sections. So far, this has been done inside the vehicle.

However, not all vehicles, not even all new vehicles, are equipped with the appropriate sensor technology and computing power to perform trajectory planning themselves. Thus, it is not possible for them to drive without a driver, e.g. from the assembly line where they were produced or from another predetermined place to an assigned place or parking lot. For this reason, one object is to create a possibility for vehicles that are not equipped with sufficient sensor technology and/or computing power to drive driverless to an assigned place within a closed area, such as factory premises or a distribution area. For this purpose, an infrastructure is provided in the closed area, which may communicate with the vehicle and replaces the sensor technology within the vehicle. Since the number of travel paths is limited and defined in such closed areas, an infrastructure external to the vehicle may be provided here, e.g. in the form of sensor technology set up at intervals along the travel paths, i.e. one or more sensors in combination.

Thus, in order to provide the possibility to move as many vehicles as possible within a closed area without a driver, a method for providing trajectory planning for a driverless transfer of a vehicle within a closed area is proposed. In the method, an external data processing system performs trajectory planning for traversing a predetermined route from a starting point to a destination point within the closed area without a driver. Trajectory planning is based on data transmitted from components of a vehicle-external infrastructure to the external data processing system, including object data and at least one exact pose of the vehicle at predetermined points in time. The planned trajectory is then sent to the vehicle for execution.

It is further provided that the data transmitted between the vehicle-external infrastructure and the external data processing system and between the vehicle and the external data processing system comprise a time stamp. By using a timestamp, each dataset may be assigned to a corresponding point in time. This is necessary for precise actuator control due to fluctuating latencies along the entire effective chain.

It is further intended that data sent from the vehicle to the external data processing system comprises odometry data from the vehicle, which is incorporated into the trajectory planning. Odometry data are very precise data on the vehicle pose, which are continuously determined by the vehicle, i.e. by the vehicle sensor technology, and are thus available.

Advantageously, the transmitted odometry data is incorporated into the trajectory planning such that it is fused with the data transmitted from the vehicle-external infrastructure to the external data processing system by means of a pose estimator provided in the external data processing system. The pose estimator is used to fuse data from the vehicle with data from the vehicle-external infrastructure, more precisely environment and object data of the sensor system, and thus to obtain an improved pose detection of the vehicle secured against data gaps. A Kalman filter may be used for this purpose.

Advantageously, the fusion is such that in the event that there are temporal gaps in the transmission from the vehicle-external infrastructure, the same are filled with the odometry data at the same time as the data is received from the vehicle-external infrastructure. Odometry data is very accurate and may be used as a gap filler over a relatively long period of time of up to a few seconds. Thus, a temporally continuous pose detection of the vehicle becomes possible, even if data from the sensor system of the vehicle-external infrastructure is not available, e.g. due to localization gaps.

It is further provided that the external data processing system comprises a time synchronization master and the time stamps of the data of the vehicle-external infrastructure and the vehicle are synchronized therewith. This ensures that all data has the same time stamp, which is important for data processing.

It is further provided that the second communication connection is a latency-laden communication connection, comprising a mobile radio connection. Almost every vehicle now offers a mobile radio connection to summon rescue in an emergency. Thus, for these vehicles, the mobile radio connection is suitable for the data connection from the vehicle to the cloud, as no additional hardware needs to be installed. This means that new vehicles may also be controlled independently of their equipment variant and thus be moved without a driver.

It is further provided that the vehicle traverses the obtained trajectory starting from the time that matches the actual instantaneous pose of the vehicle. For accurate control of the vehicle, it is important that the vehicle is able to select the exact section that matches the actual momentary pose of the vehicle after receiving a trajectory, regardless of how much time has passed for processing and transmitting the data in advance. To achieve this, it is necessary to use synchronized time stamps in the infrastructure sensor technology, the backend and within the vehicle. The trajectory specifies an exact position to be taken by the vehicle for each point in time, i.e. in predefined time steps. The vehicle may determine its current pose by means of vehicle-internal sensor technology, so that the same is available at all times. Since there is a period of time between the transmission of the trajectory and the receipt and execution of the movements by the vehicle—even if this appears to be very short, e.g. a few milliseconds—the vehicle is already in a different position when the trajectory is received, i.e. the next waypoint to be approached would already be behind the vehicle. If the vehicle tried to drive the trajectory always from the beginning, this would not be possible due to the already elapsed time. To avoid this, the time stamp of the data is used, which is advantageously synchronized via a time synchronization master, which is advantageously located in the external data processing system and is synchronized, for example, with an atomic clock. Due to the precisely synchronized time stamps of all data, the vehicle may thus jump to exactly this point in time within the trajectory at the point in time at which it begins to travel along the trajectory. This is important when there is a latency-laden communication connection between the vehicle and the external data processing system, such as a mobile radio connection.

It is further envisaged that a completed environment model and classification of the sensed objects is provided to the external data processing system by the vehicle-external infrastructure. Thus, the external data processing system may use already prepared and thus small data for trajectory planning.

Furthermore, a system comprising a vehicle, an infrastructure external to the vehicle, an external data processing system, advantageously a cloud, i.e. an IT infrastructure via the Internet, and a communication connection for exchanging data, on the one hand, between the infrastructure external to the vehicle and the external data processing system and, on the other hand, between the vehicle and the external data processing system is proposed. With the data provided by the system, the described method may be carried out.

The term "closed area" in the sense of the invention covers areas to which only certain persons have access, e.g. factory areas of automobile manufacturers, distribution areas such as parking lots, harbors, logistics areas, etc. Plant halls, multi-story car parks etc. may also fall under this term, depending on whether the method and the system are also intended for this purpose and whether the communication connections are sufficient for this purpose, i.e. whether they exist at all and are stable enough.

The communication connection between the infrastructure and the external data processing system is advantageously established via a wireless or wired Internet connection (which is as fast as possible).

Advantageously, the driverless transfer takes place at least approximately at a maximum permitted vehicle speed for the intended route. Within closed areas, a relatively low maximum speed is usually permitted, e.g. 30 km/h. Since, at least in the near future, there will still be mixed operation with vehicles driven by a person, who usually drives at the maximum speed in order to save time, driverless transfer should also take place at least approximately at this maximum speed. However, it may also be provided that a slower transfer takes place. This may advantageously be specified by the management of the closed area.

In the following, the term cloud is used synonymously with the term external data processing system.

The vehicle-external infrastructure essentially comprises a sensor system that replaces the sensor system within the vehicle, as mentioned above. The vehicle-external infrastructure is provided, for example, in the form of sensor technology placed at intervals along the travel paths, i.e., one or more sensors in combination. It provides a finished environment model, i.e., an evaluation of the sensor data, and advantageously also a classification of the detected objects. An object may be a standing or moving object, wherein multiple objects may be detected simultaneously. Sensors used as sensor technology may be cameras, radar, lidar, ultrasonic, or other sensors; or a combination thereof.

Based on data provided by the sensor system and the vehicle, the described method may be executed computer-aided, by which trajectory planning outside the vehicle, more precisely by means of a cloud-based trajectory planner, is made possible. The determined trajectory is sent to the vehicle for execution. Thus, a driverless transfer of a vehicle on a given route, i.e., from a starting point to a destination point, may be performed even for vehicles that do not have a sensor technology for (sufficient) environment recognition and corresponding computing power.

Further proposed is a system for providing trajectory planning for driverless transfer of a vehicle within a closed area, the system comprising: a vehicle, a vehicle-external infrastructure provided within the closed area, comprising a sensor system configured to detect at least one object within its range and at least one exact pose of the vehicle at predetermined time instants. It further comprises an external data processing system, and a first communication connection for data exchange between vehicle-external infrastructure and the external data processing system, and a second communication connection between the vehicle and the external data processing system, wherein the method described is carried out to provide trajectory planning.

Further features and advantages of the invention will be apparent from the following description of embodiments of the invention, with reference to the figures of the drawing showing details according to the invention, and from the claims. The individual features may be implemented individually or in any combination in a variant of the invention.

BRIEF DESCRIPTION OF THE FIGURES

Preferred embodiments of the invention are explained in more detail below with reference to the accompanying drawings.

DETAILED DESCRIPTION

Figure 1:
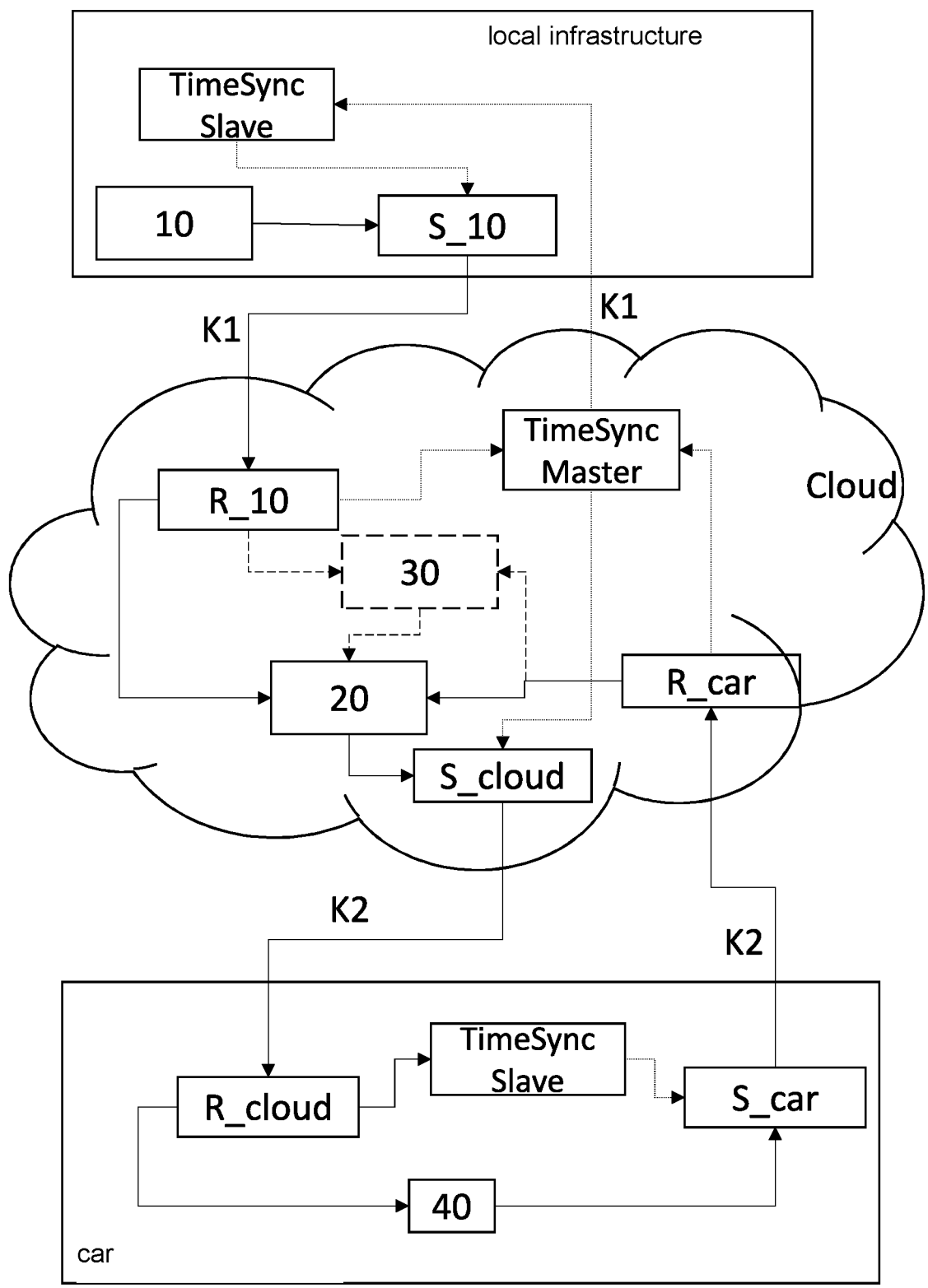
FIG. 1 shows the interrelationship of individual components of the system and the process according to one embodiment of the present invention.

In the following figure descriptions, the same elements and/or functions are provided with the same reference numerals.

Figure 2:
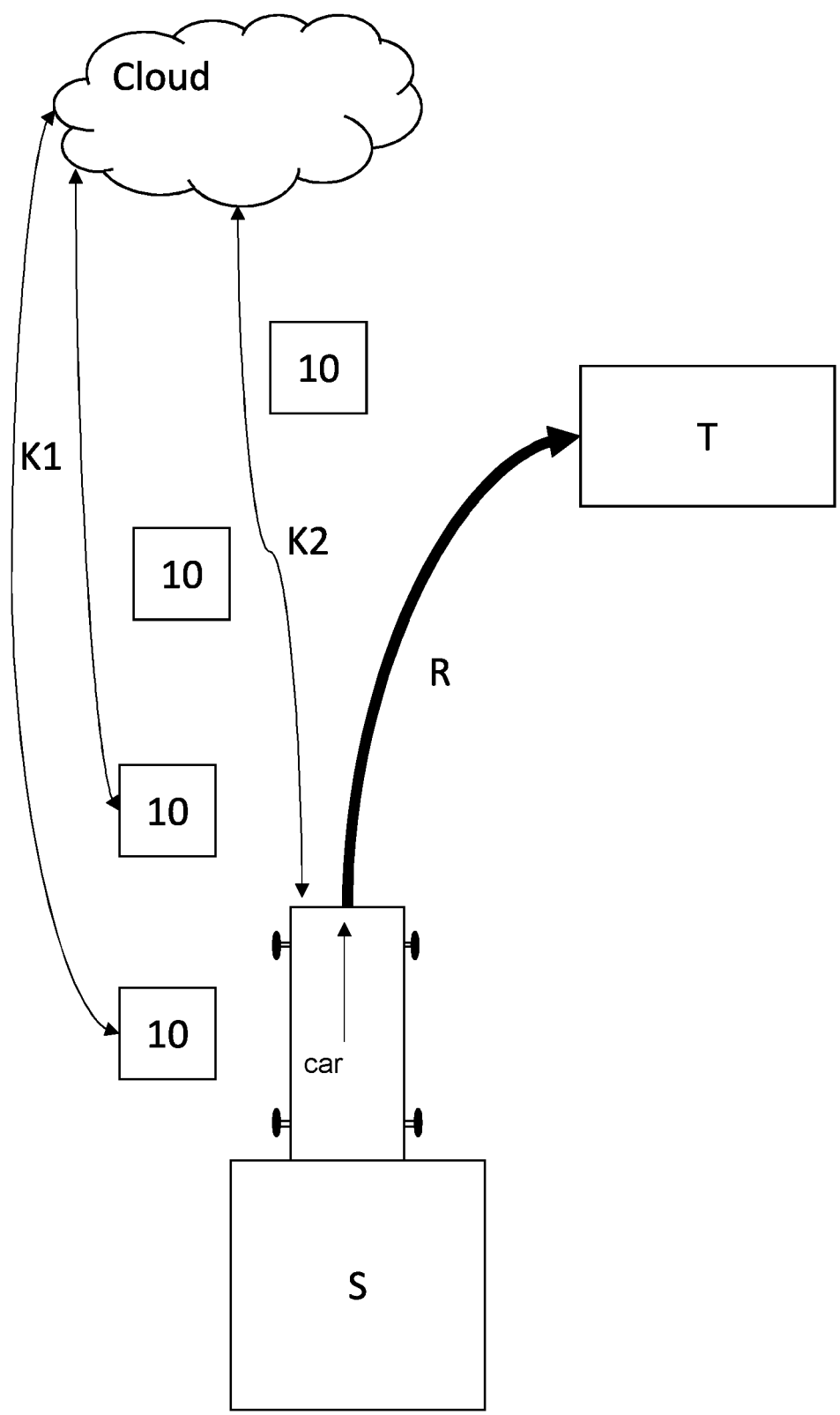
FIG. 2 shows a very simplified representation of the system according to one embodiment of the present invention.

FIG. 1 shows the exact relationship of individual components of the system and the process. FIG. 2 shows a very simplified representation of the system.

As described above and shown in detail in FIG. 1, the system comprises three main components, the vehicle-external infrastructure and/or local infrastructure, hereinafter also referred to simply as infrastructure, the external data processing system, e.g., a cloud, and the vehicle car. The local infrastructure local infrastructure is connected to the cloud cloud via a first communication connection K1, which is advantageously provided as a fast (as fast as possible) wireless or wired internet connection. The vehicle car is connected to the cloud cloud via a second communication connection K2, which is advantageously provided as a mobile radio connection.

The route R to be travelled is usually specified, for example, by a parking space management system, a distribution management system, or some other management system that manages logistics in the closed area.

For trajectory planning in the cloud, sensor data from the sensor technology 10, also referred to as sensor system, of the infrastructure local infrastructure is sent to a receive interface R_10 in the cloud via a transmit interface S_10 over a first communication interface K1 at predetermined time intervals, for example within a few milliseconds to a few hundred milliseconds. Advantageously, the sensor data has a time stamp. The sensor data may detect and classify both stationary and moving objects.

Furthermore, vehicle data, in particular odometry data, is sent from the vehicle Car, more precisely one or more corresponding devices 40, via a transmit interface S_car to a receive interface R_car in the cloud via the second communication interface K2, which is advantageously configured as a mobile radio interface. Advantageously, the vehicle data has a time stamp.

Both the data sent in the receive interface R_10 and the data sent in the receive interface R_car is now routed either directly to the trajectory planner 20 or via a pose estimator 30, where it is processed. The planned trajectory is then transmitted to the vehicle Car via a transmit interface S_cloud, where it is received by a receive interface R_cloud and forwarded to the device 40, which coordinates travelling the trajectory. The trajectory planning also takes into account objects that the sensor technology 10 has classified as obstacles, or objects that are moving to avoid the same. The exact trajectory planning will not be discussed in detail here, as this is already state of the art.

The pose estimator 30 is a safety instance used to fuse the sensor data received from the sensor system 10 and the vehicle data received from the vehicle Car. The vehicle data is advantageously odometry data, which may be used to fill in gaps in the sensor data for a predetermined period of time, e.g., a few milliseconds to a few seconds. Thus, a (brief) failure of the first communication connection K1 or even an interruption of the vehicle pose determination (i.e., a short localization gap) may be compensated and, at the same time, the determination of the pose of the vehicle may be improved.

Advantageously, a time synchronization master TimeSync Master is provided in the cloud to ensure that the data from the sensor system 10 and from the vehicle car are synchronized in time. Since data processing in the local infrastructure, i.e., environment model calculation, and trajectory planning in the cloud also cost time and are reflected as latency in the effect chain, the time synchronization master TimeSync Master is connected to the local infrastructure and synchronizes its time stamps. In addition, the time synchronization master TimeSync Master is also in contact with the vehicle Car and synchronizes its time stamp in order to compensate for a time-delayed data transmission here as well. The two time stamps of the local infrastructure and the vehicle car may thus be referred to as TimeSync Slave. The scheduled trajectory also receives a time stamp, as mentioned above, and is thus sent to the device 40 in the vehicle car via the second communication interface K2. Since this will usually be a latency-laden interface, e.g., a mobile radio interface, the transmission to the vehicle car will be time-delayed. By using the time stamps synchronized with respect to the time synchronization master TimeSync Master and comparing the current time in the device 40 in the vehicle car, the correct time on the trajectory may now be determined and the execution of the control of the vehicle car may be started. This avoids errors that would have occurred due to using a trajectory that would have been valid at an earlier time, e.g., at the time of sending from the cloud, which takes e.g., a few milliseconds to transmit. Thus, latency due to transmission and latency due to calculations can be compensated by means of the time stamps.

FIG. 2 shows an example scenario. Here, the infrastructure local infrastructure is provided as a sensor system 10 placed along a route R of a vehicle car from a starting point S, e.g., a plant exit, to a destination point T, e.g., a parking lot. For simplicity, the sensor system is shown here only on one side of the route R. It may also be provided on both sides or alternately on both sides, depending on the sensors used, the route R or other conditions. The sensor system 10 communicates with the external data processing device cloud wired or wirelessly, advantageously by means of a fast internet connection via a first communication interface K1. The vehicle car communicates with the external data processing device cloud wirelessly, advantageously by means of a mobile radio connection via a second communication interface K2.

The external data processing device cloud may also be provided as a so-called web service outside the closed area as long as a communication connection is available at a corresponding speed.

Advantageously, the vehicle is an automatic transmission vehicle.

The invention claimed is:

1. A method of providing trajectory planning for a driverless transfer of a vehicle within a closed area,
   wherein an external data processing system
   performs trajectory planning for driving a predetermined route without a driver from a starting point to a destination point within the closed area, wherein the trajectory planning is based on data transmitted from the vehicle and based on data transmitted from components of a vehicle-external infrastructure to the external data processing system, comprising object data and at least an exact pose of the vehicle at predetermined points in time, wherein the data transmitted from the vehicle to the external data processing system comprises odometry data from the vehicle that is included into the trajectory planning, wherein the transmitted odometry data is included into the trajectory planning such that it is fused with the data transmitted from the vehicle-external infrastructure to the external data processing system by means of a pose estimator provided in the external data processing system, wherein the fusion is such that in the event that there are temporal gaps in the transmission from the vehicle-external infrastructure, the temporal gaps are filled with the odometry data at the same time as the data is received from the vehicle-external infrastructure, and wherein the external data processing system communicates with the vehicle-external infrastructure via a first communication connection and the vehicle via a second communication connection; and transmits the planned trajectory to the vehicle for execution, wherein the vehicle travels the received trajectory starting from a time instant matching an actual instantaneous pose of the vehicle.

2. The method of claim 1, wherein the data transmitted between the vehicle-external infrastructure and the external data processing system and the data transmitted between the vehicle and the external data processing system comprise a time stamp.

3. The method of claim 2, wherein the external data processing system comprises a time synchronization master and the time stamp of the vehicle-external infrastructure and the vehicle are synchronized therewith.

4. The method according to claim 1, wherein the second communication connection is a latency-affected communication connection comprising at least one mobile radio connection.

5. The method according to claim 1, wherein the vehicle-external infrastructure comprises a sensor system for sensing a plurality of objects, wherein a final environment model and classification of the plurality of sensed objects is provided by the vehicle-external infrastructure.

6. A system of providing trajectory planning for the driverless transfer of the vehicle within the closed area, the system comprising:
the vehicle,
the vehicle-external infrastructure provided within the closed area, comprising a sensor system arranged to detect at least one object within its range and at least one exact pose of the vehicle at predetermined time instants,
the external data processing system, and
the first communication connection for data exchange between the vehicle-external infrastructure and the external data processing system, and
the second communication connection between the vehicle and the external data processing system,
wherein the system executes the method of providing trajectory planning according to claim 1.

7. A method of providing trajectory planning for a driverless transfer of a vehicle within a closed area,
wherein an external data processing system
performs trajectory planning for driving a predetermined route without a driver from a starting point to a destination point within the closed area,
wherein the trajectory planning is based on data transmitted from the vehicle and data transmitted from components of a vehicle-external infrastructure to the external data processing system, comprising object data and at least an exact pose of the vehicle at predetermined points in time,
wherein the data transmitted from the vehicle is fused with the data transmitted from the vehicle-external infrastructure, and
wherein temporal gaps in the transmission from the vehicle-external infrastructure are filled with the data transmitted from the vehicle at the same time as the data is received from the vehicle-external infrastructure; and
transmits the planned trajectory to the vehicle for execution,
wherein the vehicle travels the received trajectory starting from a time instant matching an actual instantaneous pose of the vehicle.

8. The method of claim 7, wherein the data transmitted between the vehicle-external infrastructure and the external data processing system and the data transmitted between the vehicle and the external data processing system comprise a time stamp.

9. The method of claim 8, wherein the external data processing system comprises a time synchronization master and the time stamp of the vehicle-external infrastructure and the vehicle are synchronized therewith.

10. The method according to claim 7, wherein the data transmitted from the vehicle to the external data processing system comprises odometry data from the vehicle which is included into the trajectory planning.

11. The method of claim 10, wherein the transmitted odometry data is included into the trajectory planning such that it is fused with the data transmitted from the vehicle-external infrastructure to the external data processing system by means of a pose estimator provided in the external data processing system.

12. The method of claim 11, wherein the fusion is such that in the event that there are temporal gaps in the transmission from the vehicle-external infrastructure, the temporal gaps are filled with the odometry data at the same time as the data is received from the vehicle-external infrastructure.

13. The method according to claim 7, wherein the external data processing system communicates with the vehicle-external infrastructure via a first communication connection and the vehicle via a second communication connection.

14. The method according to claim 13, wherein the second communication connection is a latency-affected communication connection comprising at least one mobile radio connection.

15. The method according to claim 7, wherein the vehicle-external infrastructure comprises a sensor system for sensing a plurality of objects, wherein a final environment model and classification of the plurality of sensed objects is provided by the vehicle-external infrastructure.

16. A system of providing trajectory planning for the driverless transfer of the vehicle within the closed area, the system comprising:
- the vehicle,
- the vehicle-external infrastructure provided within the closed area, comprising a sensor system arranged to detect at least one object within its range and at least one exact pose of the vehicle at predetermined time instants,
- the external data processing system, and
- a first communication connection for data exchange between the vehicle-external infrastructure and the external data processing system, and
- a second communication connection between the vehicle and the external data processing system,
- wherein the system executes the method of providing trajectory planning according to claim 7.

* * * * *